United States Patent

Tomita et al.

[11] Patent Number: 5,431,442
[45] Date of Patent: Jul. 11, 1995

[54] PASSENGER RESTRAINT STRUCTURE FOR AN AUTOMOTIVE VEHICLE

[75] Inventors: Norihiro Tomita; Toshiteru Yoshimura, both of Hiroshima, Japan

[73] Assignee: Mazda Motor Corporation, Hiroshima, Japan

[21] Appl. No.: 8,808

[22] Filed: Jan. 27, 1993

[30] Foreign Application Priority Data

Jan. 27, 1992 [JP]  Japan .................. 4-011801

[51] Int. Cl.⁶ ......................................... B60R 21/045
[52] U.S. Cl. .................................... 280/752; 180/90; 188/377; 224/282; 280/748; 280/751; 296/37.12
[58] Field of Search ........... 280/752 R, 751 R, 728 A, 280/748; 180/90; 188/371, 377; 224/282; 296/70, 37.12, 146.7

[56] References Cited

U.S. PATENT DOCUMENTS

| | | | |
|---|---|---|---|
| 4,518,172 | 5/1985 | Bortz et al. | 280/751 R |
| 4,949,990 | 8/1990 | Hirahara et al. | 280/752 R |
| 5,037,130 | 8/1991 | Okuyama | 280/752 R |
| 5,071,162 | 12/1991 | Takagawa | 280/752 R |
| 5,190,314 | 3/1993 | Takasugi | 280/752 R |
| 5,209,519 | 5/1993 | Shiga et al. | 280/728 A |

FOREIGN PATENT DOCUMENTS

| | | | |
|---|---|---|---|
| 1955057 | 5/1971 | Germany | 296/37.12 |
| 2-164638 | 6/1990 | Japan . | |
| 2-182553 | 7/1990 | Japan . | |
| 2-306846 | 12/1990 | Japan | 280/728 A |

Primary Examiner—Eric D. Culbreth
Attorney, Agent, or Firm—Keck, Mahin & Cate

[57] ABSTRACT

A passenger restraint structure for an automotive vehicle has a glove box which has at least one face that is able to be opened to a passenger compartment and is attached to an instrument panel so as to be opposed to the knees of a passenger. The glove box has an intermediate wall connecting a front wall and a rear wall of the glove box. A stiffener member is located between the glove box and a part of a vehicle body and is stiffer than the glove box for crash energy generated between the passenger and the vehicle body in the running direction of the vehicle. Upon impact, the weaker intermediate wall of the glove box is compressed, deformed and broken, thereby absorbing the crash energy.

11 Claims, 7 Drawing Sheets

PASSENGER RESTRAINT STRUCTURE FOR AN AUTOMOTIVE VEHICLE

BACKGROUND OF THE INVENTION

1. Field of the Invention

The present invention relates to a restraint structure which restrains a passenger and absorbs crash energy generated by a car collision. Especially, this invention applies to an automotive vehicle comprising a glove box which is installed into a lower part of an installment panel or dashboard or instrument panel.

2. Description of Related Art

In recent years, there has been a growing tendency to fit an air bag system in an automotive vehicle as one type of security measure. Alternatively, a passive seat belt system has been fitted into a vehicle as a security measure. The air bag system and the passive seat belt system are so arranged as to absorb crash energy acting upon an upper body part of the passenger. On the other hand, lower body parts of the passenger, especially knees, are restrained by a knee protector. The knee protector absorbs crash energy translated to the knees by deforming a vehicle member which is located in front of the passenger's knees. This kind of a knee protector is disclosed in Japanese unexamined patent publication (Kokai) No. 2-164638 and consists of a closed sectional member installed into an inside part of the instrument panel. In case of a car crash, the passenger's knees deform the member with the member absorbing crash energy acting upon the knees.

As disclosed in Japanese unexamined patent publication (Kokai) No. 2-182553, an energy transmitting member is installed inside of a lid of the above box. The crash energy is transmitted through the knees, the lid and the energy transmitting member. Then, a duct for an air conditioner, which is located in front of the transmitting member in the vehicle running direction, is deformed and absorbs the crash energy.

The above mentioned structures have problems as set forth below. Namely, inside of the instrument panel, exclusive members necessary to act as knee protectors are provided. The structures are complex and the capacity of the glove box is reduced.

SUMMARY OF THE INVENTION

Therefore, the object of the present invention is to provide a passenger restraint structure for an automotive vehicle that is simple and compact.

In order to achieve the aforesaid object, the present invention consists of a passenger restraint structure for an automotive vehicle which has a glove box which is shaped like a box, has at least one face that is able to be opened to a passenger compartment, and is attached to an instrument panel so as to be opposed to knees of a passenger. The restraint structure comprises:

an intermediate wall of the glove box connecting a front face and a rear face of the glove box;

a stiffener member, located between the glove box and a part of a vehicle body which is stiffer than the glove box for absorbing or dissipating crash energy generated between the passenger and the vehicle body in the longitudinal direction of the vehicle;

wherein the front face and the rear face of the glove box are stiffer than the intermediate walls of the glove box for collisional loading.

In the present invention, in case of a head-on collision, the knees of the passenger contact the glove box which is restricted from moving forwardly by the stiffener member and the intermediate walls of the glove box are deformed and absorb the crash energy acting upon the passenger. Accordingly, the present invention does not need any special exclusive member that acts as a knee protector and, therefore, the capacity of the glove box is able to be larger.

DESCRIPTION OF THE PREFERRED EMBODIMENTS

The present invention will be described in detail by way of the preferred embodiments with reference to the accompanying drawings.

Figure 1:
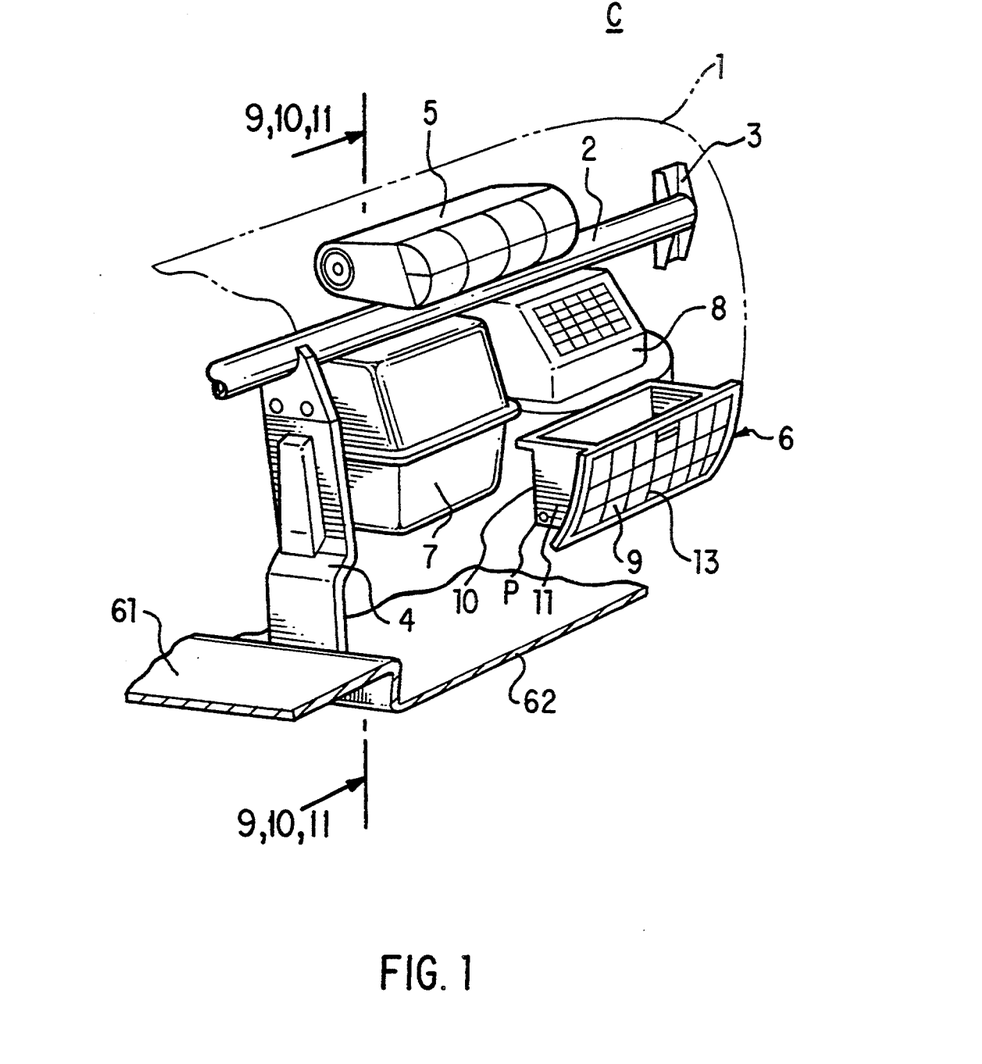
FIG. 1 is a perspective view showing an instrument panel to which the present invention is applied.

As shown in FIG. 1, an instrument panel 1 is installed in a front part of a passenger compartment C of an automotive vehicle and is formed from a metal panel and enclosed with plastic. Inside of the instrument panel 1, a steering support member 2 extends in the transverse direction of the vehicle from one side to the other with both ends of member 2 secured by brackets 3 to cowl side panels (not shown in drawings) that compose parts of hinge pillars located on opposite sides of the vehicle.

A door is attached through hinges to each hinge pillar. A center part of the steering support member is connected by reinforcement 4 to a floor tunnel 61 of a floor panel 62.

Figure 11:
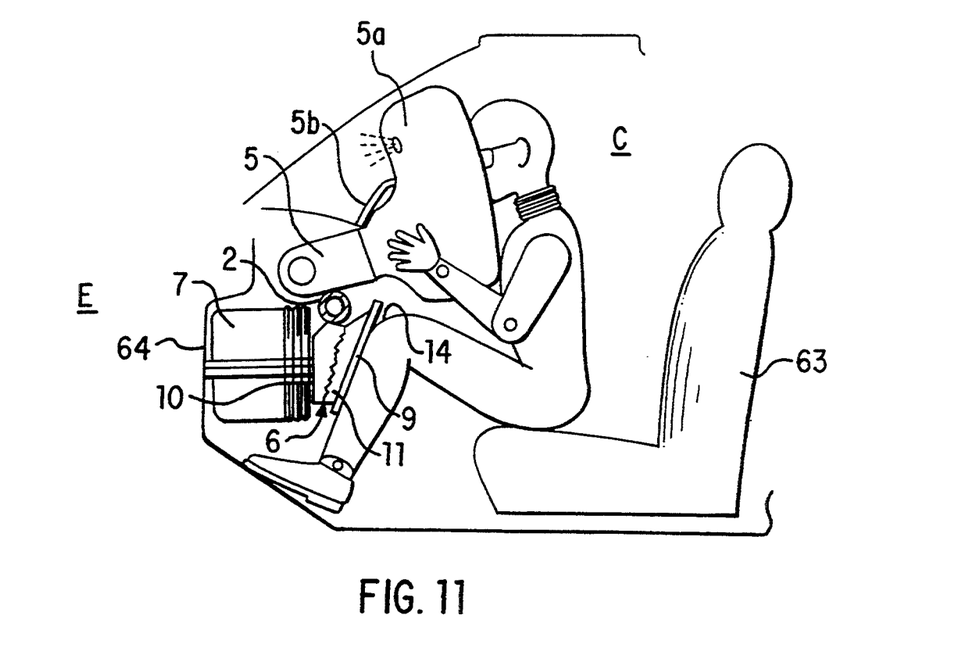
FIG. 11 is a sectional view taken along line C—C of FIG. 1 showing the present invention in a later stage of the car crash.

An air bag assembly or instrument 5 is attached to the steering support member 2 so as to be opposed to a passenger seat 63 as shown in FIG. 11. Inside of the air bag instrument 5, an air bag 5a, which is folded, is installed. In a car crash, a sensor detects the crash, and in response, an igniter fires a chemical material which generates gas that inflates the air bag 5a. The inflated air bag 5a restrains the upper body of the passenger which tends to move forwardly in the vehicle running direction.

In an opening of the instrument panel 1 below the air bag instrument 5, a glove box 6 is attached. The glove box 6 is rotatable on the axes of the pivot points or axes P which are located on opposite sides at the lower front part of the glove box 6. In front of the glove box 6 and behind a dash panel 64, see FIG. 11, in the vehicle forwardly running direction, a cooler unit 7 is installed. The cooler unit 7 encloses an evaporator for the vehicle air conditioner. If an air conditioner is not provided for the vehicle, alternatively, the cooler itself is formed stiffer by including thicker panels than those which are normally used for the cooler unit with the evaporator or by installing a metal stiffener inside of the cooler unit. The dash panel 64 divides an engine compartment E and the passenger compartment C and is attached to the main vehicle structure (see FIG. 11). The distance between the cooler unit 7 and the dash panel 64 is so short that these components tend to contact each other in an early period of a car crash. Reference numeral 8 as shown in FIG. 1 denotes a blower unit for an air conditioner which is connected to the cooler unit 7.

Figure 4:
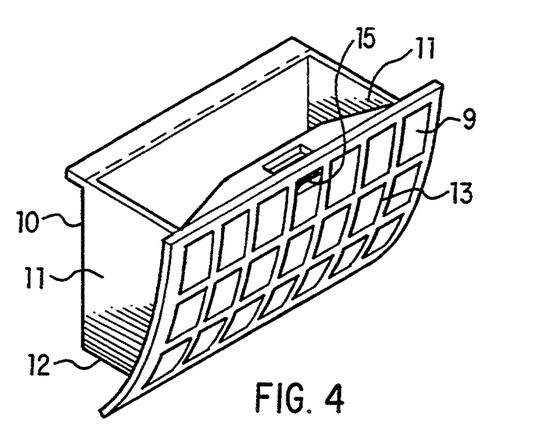
FIG. 4 is a perspective view showing the glove box of the first embodiment of the present invention viewed from the front.
Figure 5:
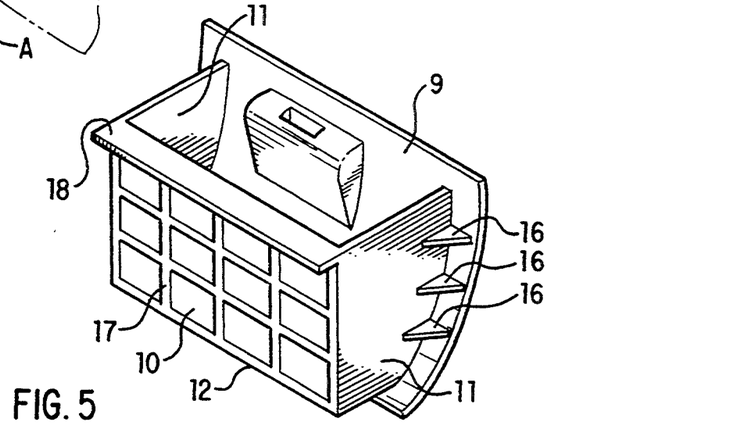
FIG. 5 is a perspective view showing the glove box of the first embodiment of the present invention viewed from the rear.

As shown in FIGS. 1 and 4, the glove box 6 pivots rearwardly to open and presents an upwardly facing opening. The glove box 6 comprises a lid or cover portion 9 as a rear wall, a front wall 10, a bottom wall 12 and side walls 11 as intermediate walls between the front wall 10, 11 and the lid or cover portion 9.

Figure 2:
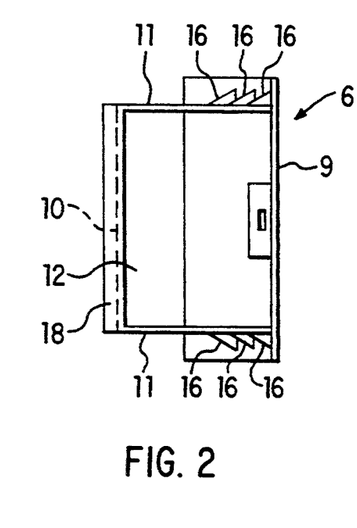
FIG. 2 is a horizontal view showing a glove box of a first embodiment of the present invention.
Figure 3:
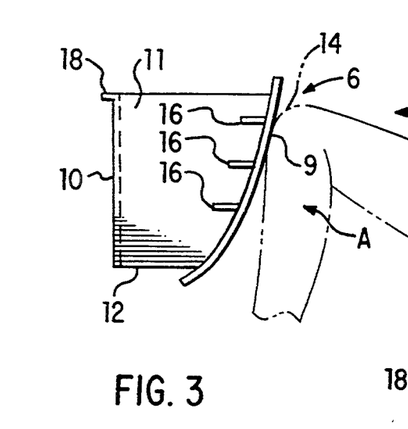
FIG. 3 is an elevational view showing the glove box of the first embodiment of the present invention.
Figure 6:
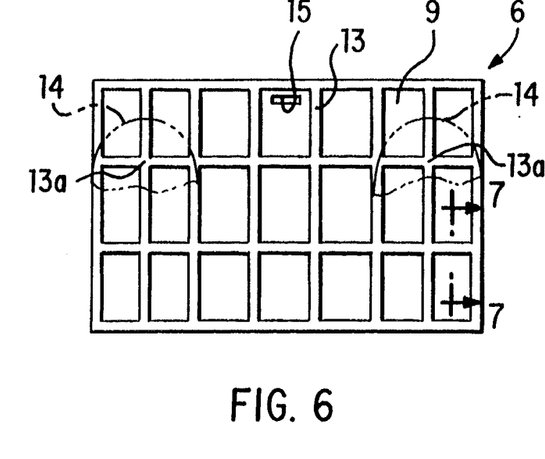
FIG. 6 is a rear view showing the rear portion of the glove box of the first embodiment, taken from direction A of FIG. 3.
Figure 7:
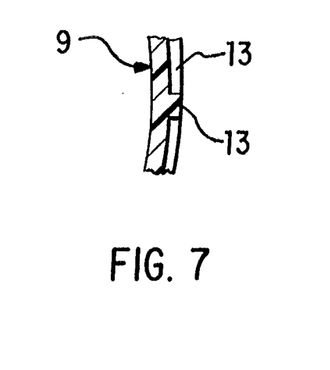
FIG. 7 is a sectional view showing the first embodiment of the present invention, taken along line B—B of FIG. 6.
Figure 8:
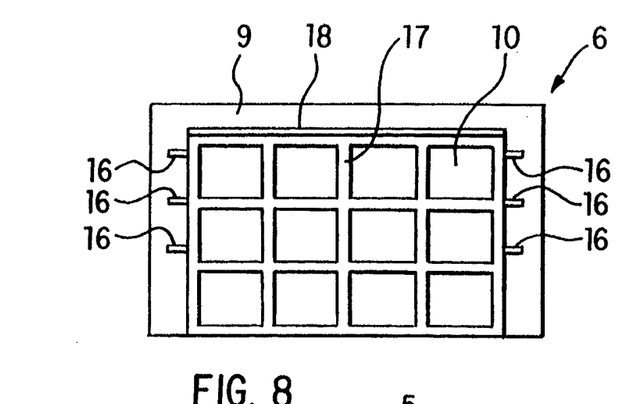
FIG. 8 is a front view showing the front portion of the glove box of the first embodiment.

The lid portion 9 is so dimensioned and sloped (with flanges) and curved to cover the opening of the instrument panel 1 and has a larger area than the area of the front wall. The lid portion 9 is uniformly patterned with raised ribs 13 which form a mesh pattern to reinforce the lid portion 9, as shown in FIGS. 6 and 7. Crossing points 13a of the mesh pattern of the ribs 13 are located at two areas of the rib pattern 13 where knees 14 of the passengers supposedly will hit in case of a head-on crash. A lock hole 15 provided to receive a lock mechanism for locking the glove box with the instrument panel 1 is recessed in the ribs 13 in an open area and does not interfere with the ribs 13. As shown in FIGS. 2 and 3, extruding portions (flanges) of the lid or cover portion 9 extend outwardly from the connection with side faces 11 in the transverse direction. Reinforcing ribs 16 are connected to the flanges of lid 9 and walls 11.

Figure 9:
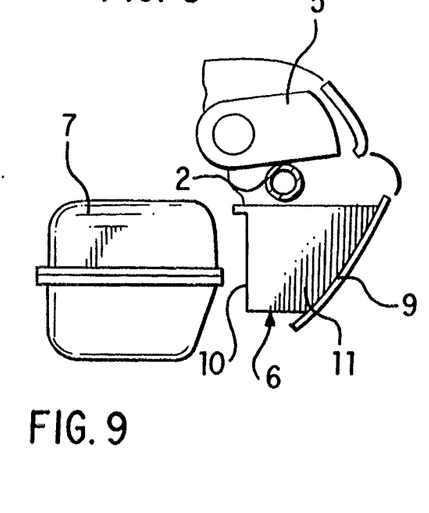
FIG. 9 is a sectional view showing the present invention, taken along line C—C of FIG. 1.

As shown in FIG. 9, the front face or wall 10 of the glove box 6 is uniformly equipped or reinforced with projecting ribs 17 which form a mesh pattern to reinforce the front face 10. The upper edge portion of the front wall 10 is equipped or reinforced with a rib 18 that extends transversely the length of wall 10.

The side walls 11 are so formed to be weaker than the lid portion 9 and the front wall 10 and can be broken or deformed by crash energy transmitted by the knees 14 of the passenger.

In this embodiment, the side walls 11 are formed thinner than the lid portion 9 and the front wall 10.

Figure 10:
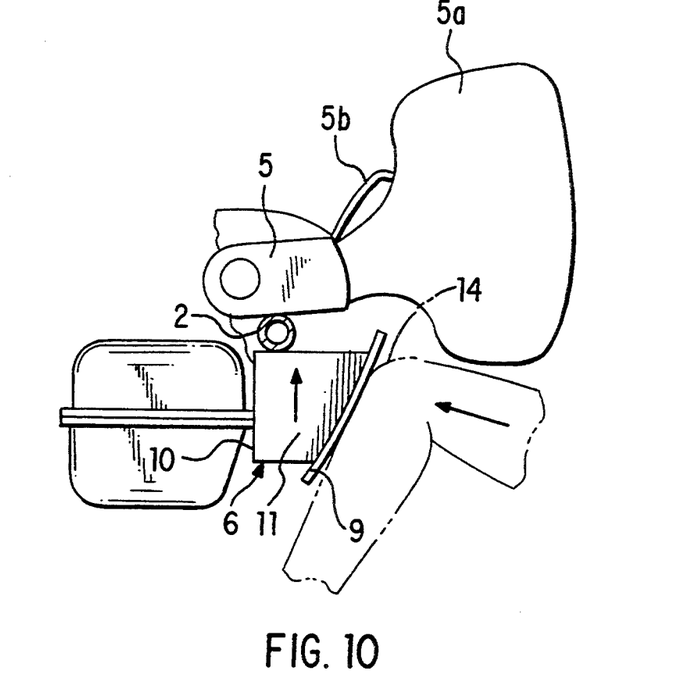
FIG. 10 is a sectional view taken along line C—C of FIG. 1 showing the present invention in an early stage of a car crash.

In the aforesaid structure, in case of a head-on crash, as shown in FIG. 10, the knees 14 of the passenger hit the lid portion 9 of the glove box 6 and push the glove box 6 forwardly in the forwardly running direction of the vehicle. Consequently, the front wall 10 of the glove box 6 hits the cooler unit 7. Simultaneously, the glove box 6 is pushed upwardly by the knees of the passenger until it reaches the steering support member 2. On the other hand, the air bag instrument 5 operates and the air bag 5a inflates and opens an air bag lid 5b which is so attached to the instrument panel 1 as to be rotatable and openable.

Figure 12:
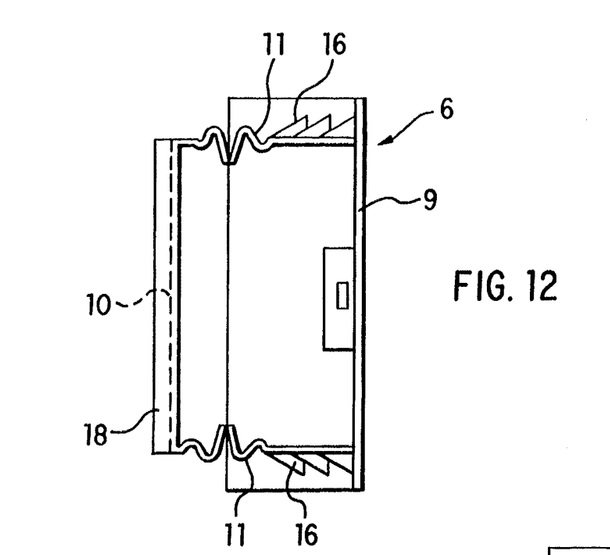
FIG. 12 is a horizontal view showing the present invention after the car crash.

Consequently, as shown in FIGS. 11 and 12, the side walls 11 of the glove box are compressed, deformed and broken, thereby absorbing the crash energy. Further movement of the knees is restricted by the cooler unit 7 which restrains the glove box from moving more forwardly.

Figure 13:
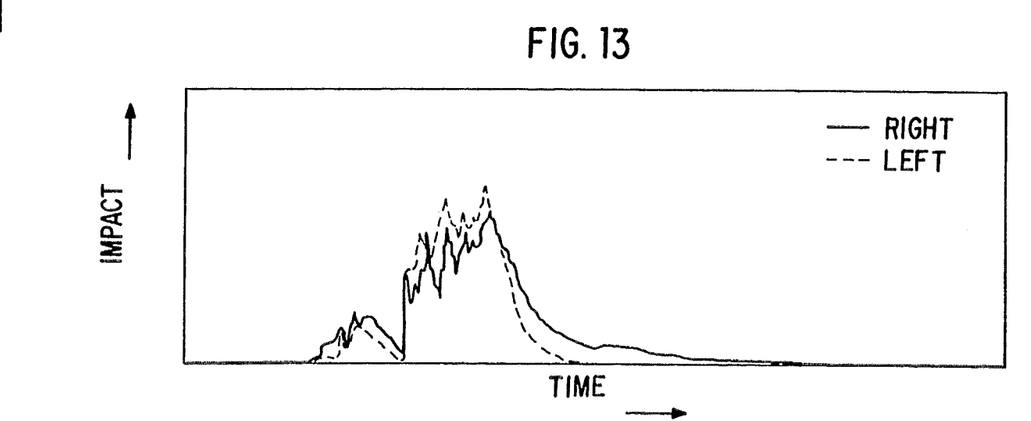
FIG. 13 is a graph showing relationship between time and impact acting upon knees of the passenger in the car crash.

FIG. 13 shows a result of a crash test with a dummy, which indicates relation between time and impact acting upon the knees of the passenger. As shown in FIG. 13, the impact reaches proper maximum value and reflects change within a proper time period. To conclude, this embodiment absorbs crash energy properly and therefore, offers the maximum security to the passenger.

Other embodiments in addition to the aforesaid embodiment are available for this invention as described below.

The ribs 13 and 17 are able to be applied other than according to the rectilinear mesh pattern. Also, if the lid portion 9 and the front wall 10 are of sufficient thickness to have sufficient strength, then the ribs 13 and the ribs 17 can be omitted.

Figure 14:
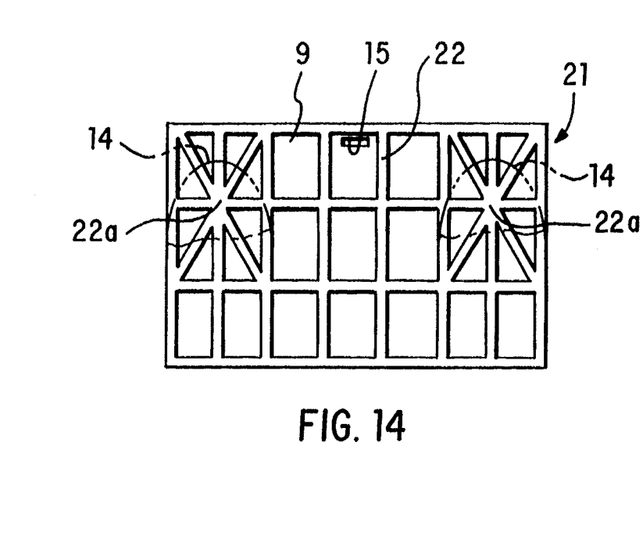
FIG. 14 is a rear view showing a rear view of a second embodiment of the present invention taken from the direction A of FIG. 3.

As shown in FIG. 14, density of the ribs 22 on the lid or cover portion 21 is greater at the points where the knees 14 of the passenger hit than at other places. The crossing points 22a are more strengthened in this fashion.

The glove box 6 can be made with fiber reinforced plastic (FRP). In this case, the side walls 11 are made to contain less content of fiber than the lid portion 9 and the front face 10, even though the walls have the same thickness.

Figure 15:
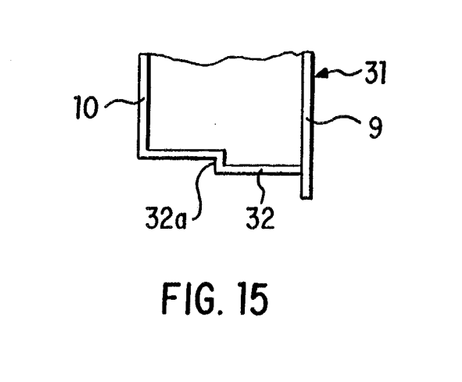
FIG. 15 is a horizontal view showing a glove box of a third embodiment of the present invention.
Figure 16:
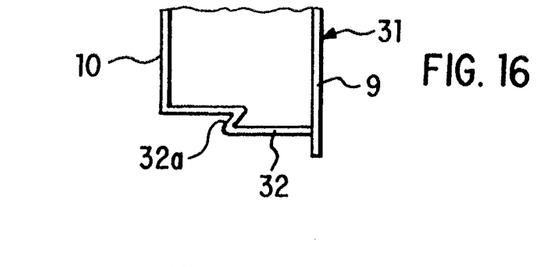
FIG. 16 is a horizontal view showing the glove box of the third embodiment of the present invention after a car crash.

As shown in FIG. 15, a glove box 31 is formed with side walls 32 which are stepped or have right angle offset portions 32a. In case of a car crash, as shown in FIG. 16, the side walls 32 begin to be compressed and deform, ultimately breaking at the right angle bends 32a.

Figure 17:
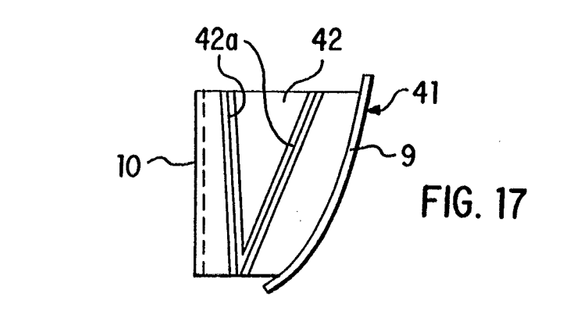
FIG. 17 is an elevational view showing a glove box of a fourth embodiment of the present invention.
Figure 18:
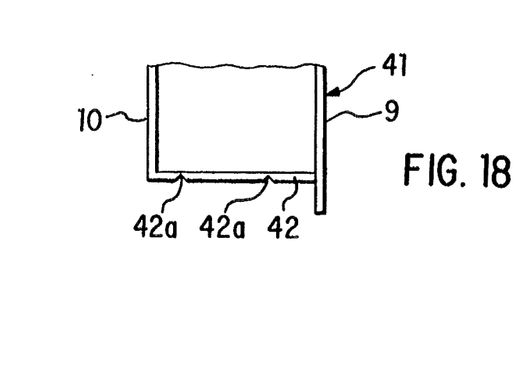
FIG. 18 is a horizontal view showing the glove box of the fourth embodiment of the present invention.
Figure 19:
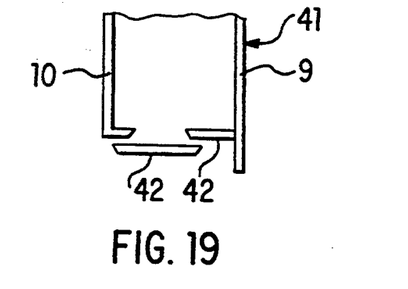
FIG. 19 is a horizontal view showing the glove box of the fourth embodiment of the present invention after the car crash.

As shown in FIGS. 17 and 18, a glove box 41 is formed with side walls 42 which have grooves 42a. In case of the car crash, as shown in FIG. 19, the side walls 42 begin to be compressed and deform and are eventually broken at the grooves 42a.

Figure 20:
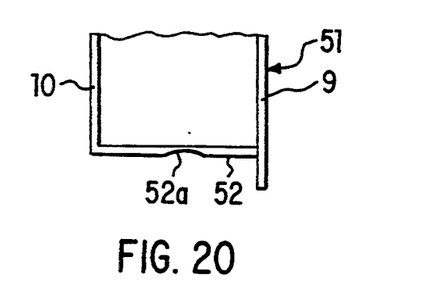
FIG. 20 is a horizontal view showing a glove box of a fifth embodiment of the present invention.
Figure 21:
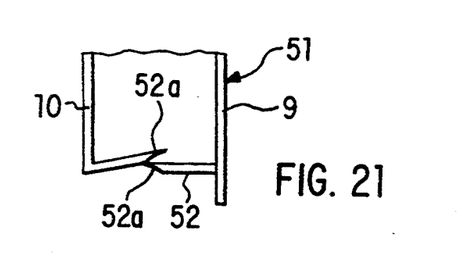
FIG. 21 is a horizontal view showing the glove box of the fifth embodiment of the present invention after the car crash.

As shown in FIG. 20, a glove box 51 is formed with side walls 52 which have thinner mid portions 52a than the remaining portions. In case of a car crash, as shown in FIG. 21, the side walls 52 begin to be compressed and deform and ultimately are broken at the thinner mid portions 52a.

Figure 22:
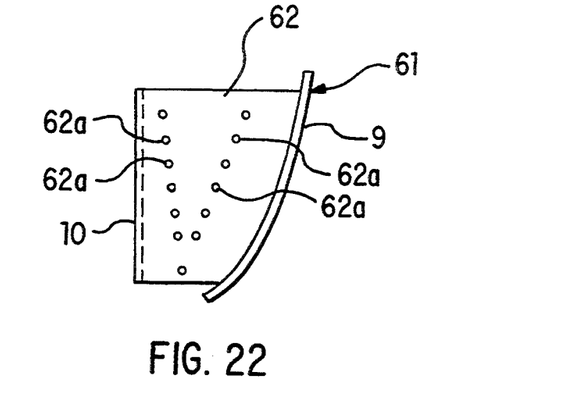
FIG. 22 is a vertical view showing a glove box of a sixth embodiment of the present invention.
Figure 23:
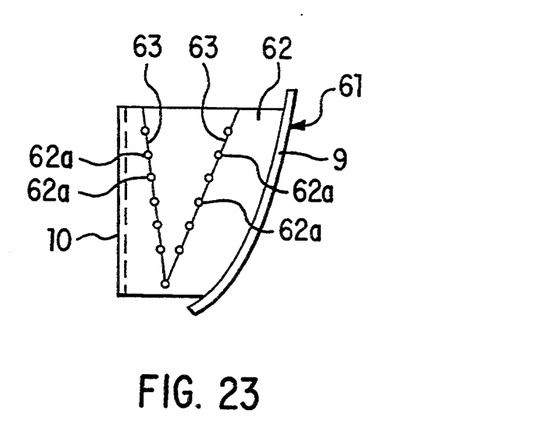
FIG. 23 is a vertical view showing the glove box of the sixth embodiment of the present invention after the car crash.

As shown in FIG. 22, a glove box 61 is formed with side walls 62 which have a large number of aligned or rows of holes 62a. In case of a car crash, as shown in FIG. 23, the side walls 62 begin to be compressed and deform ultimately breaking, as indicated by 63, at the holes 62a.

Figure 24:
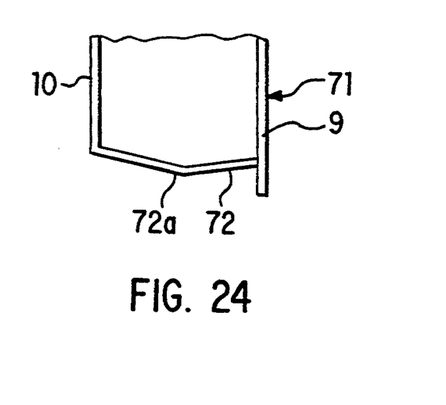
FIG. 24 is a vertical view showing the glove box of a seventh embodiment of the present invention.

As shown in FIG. 24, a glove box 71 is formed with side walls 72 which have outwardly bent portions 72a. In case of a car crash, the side walls 72 begin to be compressed and deform, eventually breaking at the bends 72a.

In the above description, the side walls are weakened relative to the lid portion and the front face. The concepts for weakening the side walls also can be applied to weaken the bottom wall 12 or only the bottom wall 12 can be weakened. Namely, it is preferable to form an intermediate wall between the lid portion and the front faces weaker than the lid portion and the front face as to be compressed, to be broken and to absorb the load acting upon the knees 14 by the knees hitting the lid 9 during and as a result of the car crash.

What is claimed is:

1. A passenger restraint structure for an automotive vehicle comprising:
    a dash panel separating an engine compartment from a passenger compartment,
    a glove box, pivotable so as to be opened into said passenger compartment and attached to an instrument panel of the vehicle, said glove box including a front wall, a cover portion opposed to knees of a passenger, and intermediate walls connecting the front wall and the cover portion of the glove box, said cover portion being sloped and curved so as to cover an opening in said instrument panel,
    said intermediate walls being weaker than the front wall and the cover portion of the glove box,
    a steering support member disposed above said glove box, extending in a transverse direction of the automotive vehicle, and having opposite ends,
    means for securing each end of said steering support member to a portion of the automotive vehicle, and
    a cooler unit disposed in front of said glove box and behind said dash panel so that during a crash, the cover portion of the glove box is hit by the knees of the passenger and crash energy from the knees of the passenger is received by the steering support member and the cooler unit as the glove box is pushed forwardly and upwardly by the knees of the passenger so that the intermediate walls of the glove box are compressed and deformed responsive to said crash energy, thereby absorbing said crash energy.

2. A passenger restraint structure as defined by claim 1, and further comprising raised ribs forming a mesh pattern provided on said cover portion.

3. A passenger restraint structure as defined by claim 2, wherein said mesh pattern includes crossing points, at which a plurality of said ribs intersect, located where the knees of the passenger hit during the crash.

4. A passenger restraint structure as defined by claim 3, wherein the plurality of ribs extends radially outwardly from each of said crossing points.

5. A passenger restraint structure as defined by claim 1, and further comprising flanges formed integrally with said cover portion and extending laterally outwardly beyond said intermediate walls.

6. A passenger restraint structure as defined by claim 5, and further comprising reinforcing ribs connecting said flanges and said intermediate walls.

7. A passenger restraint structure as defined by claim 1, wherein each of said intermediate walls is provided with portions which are offset therefrom at a right angle and deform responsive to said crash energy.

8. A passenger restraint structure as defined by claim 1, wherein each of said intermediate walls is provided with grooves which are compressed and break responsive to said crash energy.

9. A passenger restraint structure as defined by claim 1, wherein each of said intermediate walls is provided with midportions of smaller thicknesses which are compressed and break responsive to said crash energy.

10. A passenger restraint structure as defined by claim 1, wherein each of said intermediate walls is provided with an outwardly bent portion which deforms and breaks responsive to said crash energy.

11. A passenger restraint structure as defined by claim 1, wherein each of said intermediate walls is provided with rows of holes forming weakened portions which deform and break responsive to said crash energy.

* * * * *